United States Patent
Gruetzmann et al.

(10) Patent No.: US 8,836,764 B2
(45) Date of Patent: Sep. 16, 2014

(54) METHOD AND MEASURING ASSEMBLY FOR DETERMINING THE WHEEL OR AXLE GEOMETRY OF A VEHICLE

(75) Inventors: Andreas Gruetzmann, Stuttgart (DE); Steffen Abraham, Hildesheim (DE); Andreas Haja, Hannover (DE); Christian Knoll, Stuttgart (DE); Daniel Muhle, Herford (DE); Matthias Gebhard, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 812 days.

(21) Appl. No.: 13/119,560

(22) PCT Filed: Jul. 27, 2009

(86) PCT No.: PCT/EP2009/059627
§ 371 (c)(1),
(2), (4) Date: Oct. 20, 2011

(87) PCT Pub. No.: WO2010/031627
PCT Pub. Date: Mar. 25, 2010

(65) Prior Publication Data
US 2012/0026293 A1 Feb. 2, 2012

(30) Foreign Application Priority Data
Sep. 17, 2008 (DE) .......................... 10 2008 042 145

(51) Int. Cl.
*H04N 13/02* (2006.01)
*G01B 11/275* (2006.01)

(52) U.S. Cl.
CPC .................................. *G01B 11/275* (2013.01); *G01B 2210/20* (2013.01)
USPC ......................................................... 348/46

(58) Field of Classification Search
CPC ....... G06T 7/0059; G06T 7/0079; G06T 7/81; G06T 7/40; G06T 7/401; G06T 7/407; G06T 7/00; G01B 11/275; G01B 2210/20; G01B 2210/26; G01B 2210/283
See application file for complete search history.

(56) References Cited

U.S. PATENT DOCUMENTS

2004/0240754 A1* 12/2004 Smith et al. ................... 382/286
2005/0068522 A1 3/2005 Dorrance et al.
(Continued)

FOREIGN PATENT DOCUMENTS

DE 197 57 760 7/1999
DE 10 2005 036671 2/2008
(Continued)

OTHER PUBLICATIONS

B. Rosenhahn, H. Ho, and B. Klette: "Block matching based on 2D-3D pose estimation," Proc. Image and Vision Computing 2004, pp. 309-314, 2004, Landcarc Research Ltd., Akaroa, New Zealand.
Papenberg et al., "Highly accurate optic flow computation with theoretically justified warping" in Int. Journal of Computer Vision, vol. 67, No. 2, pp. 141-158, Apr. 2006.
(Continued)

*Primary Examiner* — Sath V Perungavoor
*Assistant Examiner* — Peter D Le
(74) *Attorney, Agent, or Firm* — Kenyon & Kenyon LLP (57) ABSTRACT

In a method for determining a wheel or axle geometry of a vehicle, the following steps are provided: illuminating a wheel region with structured and with unstructured light during a motion of at least one wheel and/or of the vehicle; acquiring multiple images of the wheel region during the illumination, in order to create a three-dimensional surface model having surface parameters, a texture model having texture parameters, and a motion model having motion parameters of the sensed wheel region; calculating values for the surface parameters, the texture parameters, and the motion parameters using a variation computation as a function of the acquired images, in order to minimize a deviation of the three-dimensional surface model, texture model, and motion model from image data of the acquired images; and determining a rotation axis and/or a rotation center of the wheel as a function of the calculated values of the motion parameters.

13 Claims, 7 Drawing Sheets

(56) References Cited

U.S. PATENT DOCUMENTS

| | | | |
|---|---|---|---|
| 2006/0274302 A1* | 12/2006 | Shylanski et al. | 356/139.09 |
| 2007/0124949 A1 | 6/2007 | Burns et al. | |
| 2008/0119978 A1* | 5/2008 | Stieff et al. | 701/29 |
| 2008/0148581 A1 | 6/2008 | Boni et al. | |
| 2009/0031782 A1* | 2/2009 | Jackson et al. | 73/1.75 |
| 2009/0055043 A1* | 2/2009 | Mian et al. | 701/29 |

FOREIGN PATENT DOCUMENTS

| | | |
|---|---|---|
| DE | 10 2006 035 924 | 2/2008 |
| DE | 10 2006 048 725 | 4/2008 |
| EP | 0 214 120 | 3/1987 |
| EP | 1 505 367 | 2/2005 |

OTHER PUBLICATIONS

"Numerical Recipes in C/C++: The Art of Scientific Computing," Cambridge University Press, 2002.

T.F. Chan and L.A. Vese, "Active Contours Without Edges," in IEEE Transactions on Image Processing, vol. 10, No. 2, pp. 266-277.

J.A. Sethian, "Level Set Methods and Fast Marching Methods: Evolving Interfaces in Computational Geometry, Fluid Mechanics, Computer Vision and Material Science," Cambridge University Press, 1999.

International Search Report for PCT/EP2009/059627, dated Mar. 1, 2010.

B. Rosenhahn, H. Ho, and B. Klette: "Block matching based on 2D-3D pose estimation," Proc. Image and Vision Computing 2004, pp. 309-314, 2004, Landcare Research Ltd., Akaroa, New Zealand.

\* cited by examiner

METHOD AND MEASURING ASSEMBLY FOR DETERMINING THE WHEEL OR AXLE GEOMETRY OF A VEHICLE

FIELD OF THE INVENTION

The present invention relates to a method and a measurement assemblage for determining the wheel geometry or axle geometry of a vehicle. This can be done, for example in the context of a three-dimensional chassis measurement, in order to determine the track or camber on a motor vehicle by optical measurement technology, and in particular on the basis of digitally acquired images of the vehicle.

BACKGROUND INFORMATION

In the past, optical methods were usually used for chassis measurement; in these methods, special measurement adapters having optical identifiers or markings needed to be mounted on the respective vehicle wheel, and then evaluated using image technology. DE 197 57 760, for example, discloses corresponding methods. Because the installation of corresponding auxiliary equipment on the vehicle or the bodywork is time-consuming, further measurement methods have been developed that allow measurement without add-ons or modifications to the vehicle.

In EP 0 280 941, for example, laser lines are projected onto a wheel that is rotated locally in a roller set. The evaluation method carried out there for the measured values that are obtained explicitly requires that the wheel rotate only locally. A structured illumination in the form of dots or ribbons of light, and a subsequent evaluation of the image data obtained, are also explained in EP 1 505 367 and in DE 10 2006 048 725.

Conventional methods for axle measurement must, disadvantageously, use either features attached to the vehicle that are dynamically tracked via an image sequence. Artificially attached features must be laboriously attached to the vehicle by the particular service facility. The known image processing and evaluation methods furthermore often require that the wheel rotate only locally, and that, for example, the vehicle not move. In the case of the evaluation and sensing methods using a structure projection, a wheel rotation as a rule cannot be detected. Determination of a wheel rim runout is thus possible only with low accuracy, even when the vehicle is traveling past.

It is therefore desirable to make available an improved method for determining the axle or wheel geometry of a vehicle.

SUMMARY

A method is therefore disclosed for determining or calculating axle geometry, in which a wheel region is illuminated with structured and with unstructured light during a motion of at least one wheel and/or of the vehicle. Multiple images of the wheel region are generated during the illumination, in order to create a three-dimensional surface model having surface parameters, a texture model having texture parameters, and a motion model having motion parameters of the wheel region. A calculation is performed of values for the surface parameters, the texture parameters, and the motion parameters using a variation computation as a function of the acquired images, in order to minimize a deviation of the three-dimensional surface model, texture model, and motion model from image data of the acquired images. Lastly, a determination is made of a rotation axis and/or a rotation center of the wheel as a function of the calculated values of the motion parameters.

What is acquired by way of the structured illumination, for example in the form of ribbons or dots of light or other regular patterns, is therefore more or less a stereo image of the rolling wheels. This allows creation of a surface model, for example by triangulation, or at least the creation of a three-dimensional point cloud. The texture parameters correspond, for example, to two-dimensional grayscale values that result in the context of illumination with unstructured or diffuse light. The additional consideration of a motion model yields a particularly robust and comprehensive three-dimensional model of the wheel and, for example, parts of the vehicle such as the fender or wheel well. Because the rotation axis of the corresponding vehicle wheel is determined from the point measurements, i.e. in the context of the structured illumination while the vehicle travels past, a kinematic modeling can be performed as a motion model. The combination of the motion model with the surface model and the texture model furnishes a particularly reliable and additionally usable three-dimensional model.

In an expansion of the method, the following method steps are furthermore provided: illuminating the wheel region with structured and with unstructured light while the vehicle and/or wheel is stationary; acquiring multiple images of the wheel region during illumination, in order to generate measurement image data of the wheel; modifying the values of the motion parameters, with fixed values for the surface and texture parameters, using a variation computation, in such a way that a deviation of the three-dimensional surface model, texture model, and motion model from the measurement image data becomes minimized; and determining the track, camber, and normal and/or translation vector of the wheel as a function of the modified values of the motion parameters.

Thus, while a calibration operation for creating the three-dimensional model for the moving wheel or vehicle is initially carried out, the actual determination of the axle geometry is accomplished in the individual measurement operation, for example with the vehicle stationary. The latter can be accomplished again with recourse to a variation computation or in the context of an optimization task, whereupon, as a result, corresponding values for the model parameters are ascertained. The variables required for the wheel or axle geometry can then be derived on the basis of the model parameters.

For a specific variation computation, a minimization of a sum of a first, second, and third term can be accomplished. The first term corresponds, for example, to a degree of deviation between acquired grayscale image data and a projection of texture parameters subjected to the motion model and mapped onto the three-dimensional surface model. The second term can encompass a degree of deviation between three-dimensional point clouds determined from the acquired images and three-dimensional surface parameters subjected to the motion model. The third term corresponds, for example, to a norm of the motion model that depends on a geometric transformation by the motion parameters and the kinematic parameters. The terms can furthermore be provided with weighting factors. The three terms correspond respectively to the surface model, the texture model, and the motion model.

It is also possible to use different wheels on the same axis as the basis for calculating the values for the surface parameters, the texture parameters, and the motion parameters. This then yields more supporting points than when only a single wheel is taken into consideration.

In a variant of the method, a bodywork region adjacent to wheel region is also sensed, and a segmentation is performed in terms of the affinity of an acquired image point with the wheel or with the bodywork region.

The sum in the context of the variation computation can correspondingly encompass a fourth term that corresponds to a norm of a segmentation term. The segmentation norm depends, as a rule, on texture parameters subjected to the motion model and mapped onto the three-dimensional surface model, and on the three-dimensional surface parameters subjected to the motion model. The segmentation can serve, for example, to determine a ride height of the vehicle.

Also disclosed is a measurement assemblage that is suitable for carrying out a corresponding method for determining a wheel or axle geometry. The measurement assemblage has an illumination device for illuminating at least one wheel region of a vehicle with structured and with unstructured light, at least one image acquisition device for acquiring image data or measurement image data of the wheel region, and a control and evaluation device which is configured in such a way that an above-described method is carried out. A measurement assemblage can be set up, for example, in the service facility or as a measurement station.

Example embodiments of the present invention provide a computer program project that brings about the execution of a corresponding method on a program-controlled computing device or control device. Suitable as a program-controlled computing device or control device is, for example, a PC or a computer of a control room for open- and closed-loop control of the measurement assemblage, on which corresponding software is installed. The computer program product can be implemented, for example, in the manner of a data medium such as, for example, a USB stick, floppy disk, CD-ROM, DVD, or can also be implemented on a server device as a downloadable program file.

Further example embodiments of the present invention are described below.

DETAILED DESCRIPTION

In the Figures, unless otherwise indicated, identical or functionally identical elements have been provided with the same reference characters.

Figure 1:
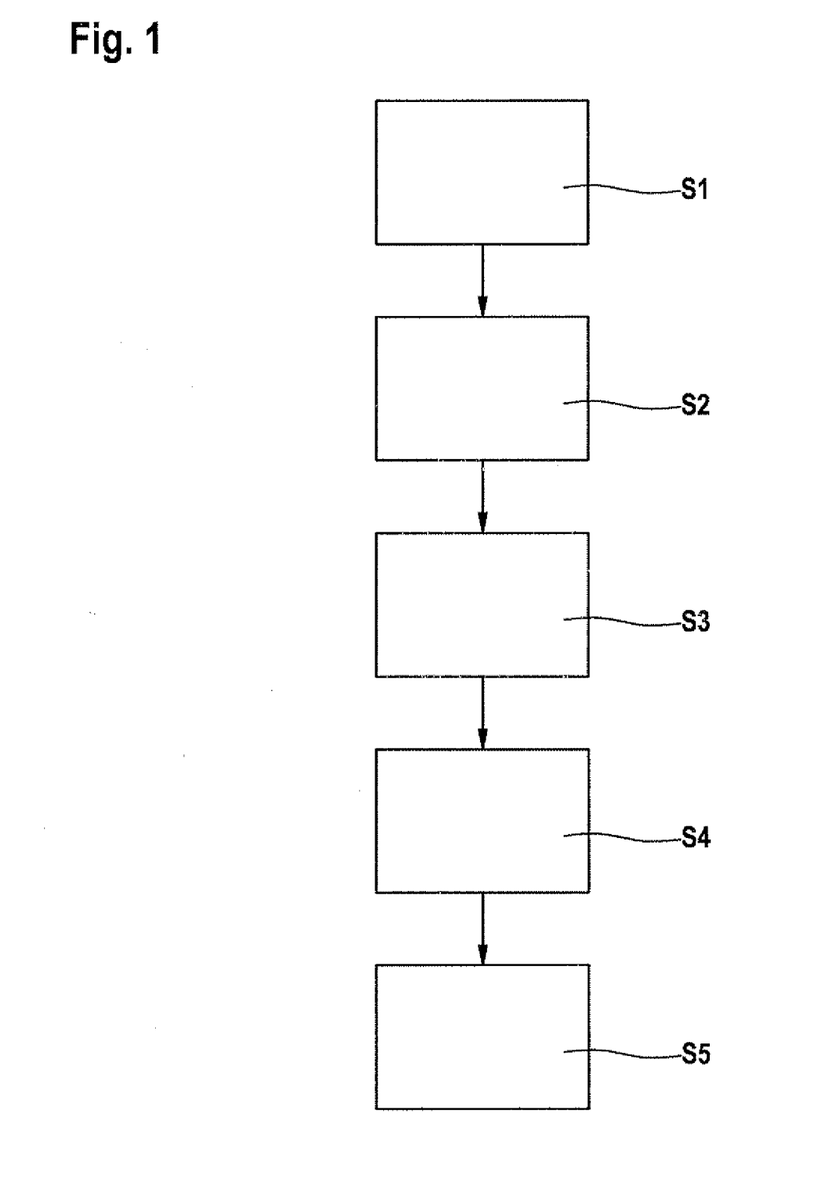
FIG. 1 is a flow chart for a method for determining an axle geometry.

FIG. 1 is a flow chart for a method for determining a wheel or axle geometry of a vehicle. Method steps S1 and S2 describe a calibration operation for determining a three-dimensional model of the wheel region of a vehicle. Steps S3 and S4 designate an individual measurement on the vehicle in order to determine the respective variables of the wheel or axle geometry. In step S5 the result is indicated, for example a track or camber of wheels.

In step S1, multiple individual images of the wheel region, for example with alternatingly structured or unstructured illumination, are therefore taken. The structured illumination and imaging can be accomplished with either a stereo or mono camera. This enables a three-dimensional sensing of the surface, while the images acquired with unstructured illumination, for example in diffuse light, yield a two-dimensional grayscale for the individual image points. The vehicle moves during the calibration operation, so that the wheel rotation can also be sensed. For example, the calibration can occur as the vehicle to be measured drives past the measurement assemblage provided in a service facility.

In the subsequent step S2, a three-dimensional model for the sensed wheel region is created with the aid of a surface model, a texture model, and a motion model. The components of the three-dimensional model have surface parameters, texture parameters, and motion parameters. The corresponding values for the parameters result from a variation computation, the image data from the structured and unstructured illumination being used as support points. Thanks to the model produced in step S2, the rotation axis or rotation center of the wheel can be ascertained from the values of the motion parameters.

In order to then to perform an individual measurement in step S3, the vehicle is subjected (at a standstill) once again to structured and unstructured illumination, images being acquired in each case. An adaptation of the already existing three-dimensional model then takes place in step S4, although the motion parameters are varied.

From the motion parameters, it is possible to ascertain track vectors, camber vectors, and normal and translation vectors of the wheel, which are outputted in the wheel or axle measurement step S5.

Figure 2:
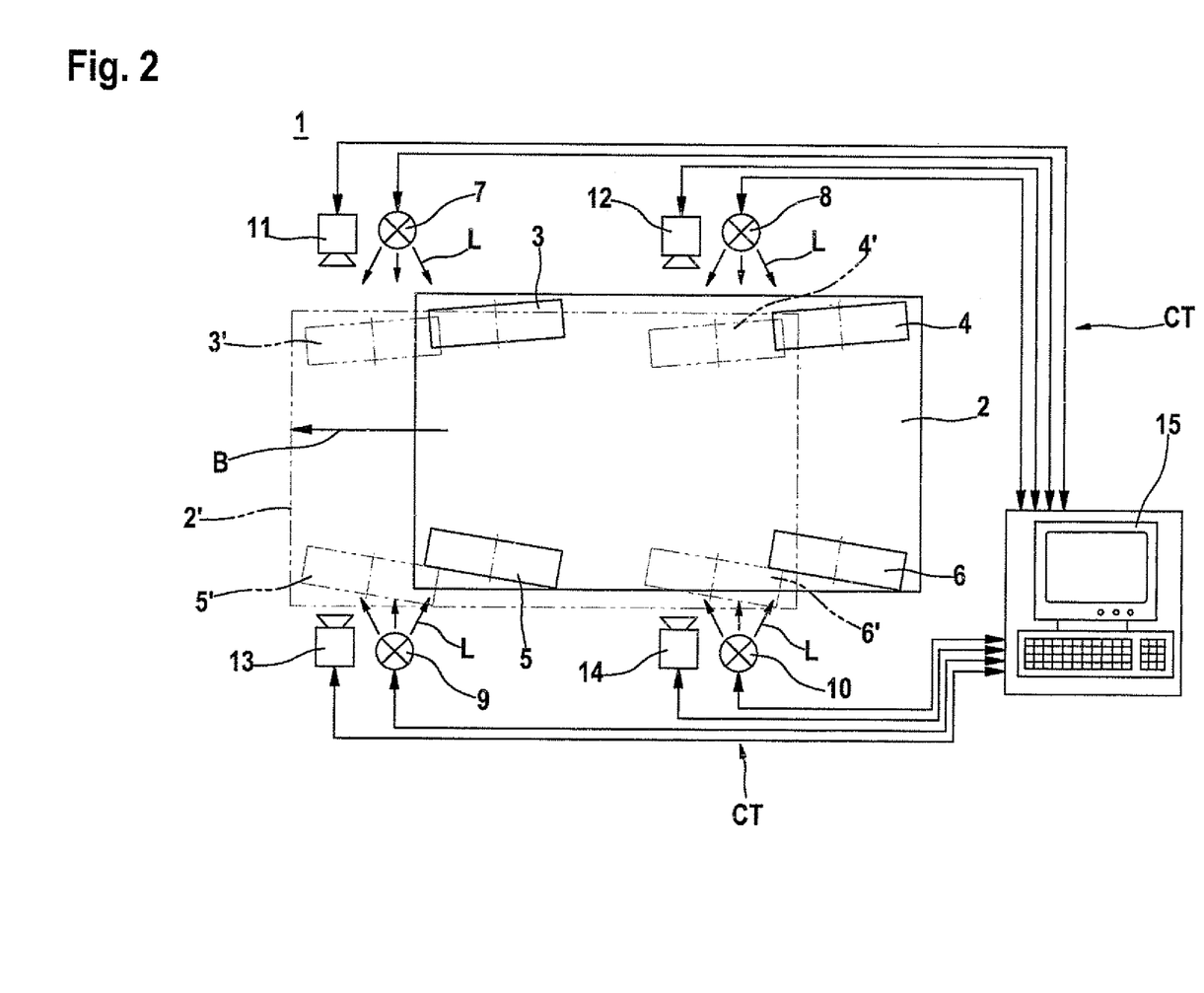
FIG. 2 schematically depicts a measurement assemblage for determining an axle geometry.

FIG. 2 shows a measurement assemblage that is suitable for carrying out the method. Measurement assemblage 1 has, for example, illumination devices 7, 8, 9, 10 and sensing devices or cameras 11, 12, 13, 14 at the predicted positions of wheels 3, 4, 5, 6 of a vehicle 2. FIG. 2 schematically indicates vehicles 2, with four wheels 3, 4, 5, 6, which moves (for example in the calibration operation) along the illumination and cameras; this is indicated by arrow B. The position existing after the motion is indicated by reference characters 2', 3', 4', 5', 6'.

Illumination devices 7, 8, 9, 10 are suitable for generating structured and unstructured illuminations, such as strips or grids of light or regular patterns of dots of light. Cameras 11, 12, 13, 14 deliver corresponding control signals or image signals CT to a control and evaluation computer 15. The latter also coordinates the measurement sequence so that, for example, a method sequence indicated in FIG. 1 is carried out.

Figure 3A:
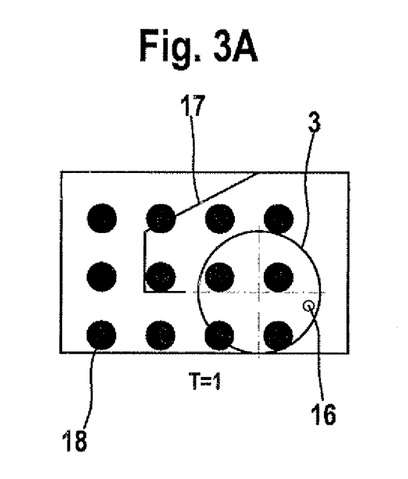
FIG. 3 shows schematic depictions of structured and unstructured illumination.
Figure 3B:
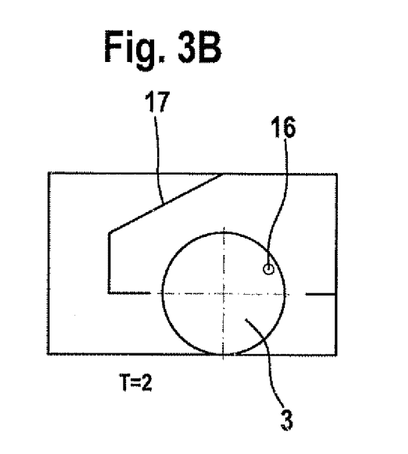
Figure 3C:
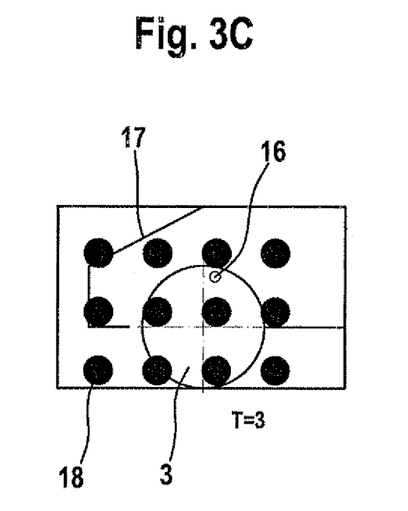
Figure 3D:
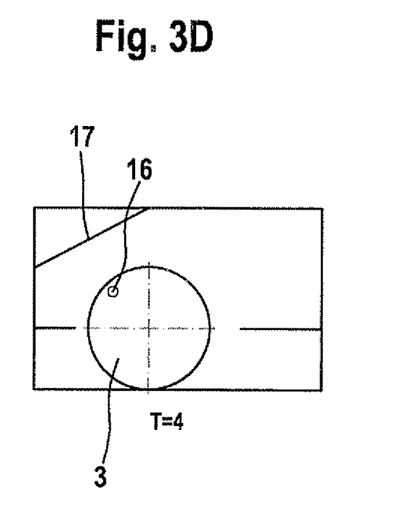

In the calibration operation, multiple individual images are acquired using alternatingly structured and unstructured illumination. This serves to generate a common 3D model, and to determine the rotation axis and wheel center. For each subsequent individual measurement (the actual measurement operation to ascertain the axle or wheel geometry), an image of the wheel is acquired using the camera system as depicted in FIG. 2. FIG. 3 shows a sequence of illumination or image-acquisition situations with structured light (FIGS. 3A and 3C) and unstructured light (FIGS. 3B and 3D). Body parts 17 in the vicinity of wheel 3 being measured are shown by way of example under each illumination type. A marking 16 is drawn in so as to indicate the motion of wheel 3. The sequence of FIGS. 3A, 3B, 3C, and 3D corresponds to a time progression T=1, 2, 3, and 4. Marking 16 thus moves in accordance with a rotation of wheel 3.

A stereo camera can be used to acquire and ascertain the three-dimensional surface model. For each individual image acquisition under structured illumination at times T=1 and T=3, the projected measurement points from the stereo image pair, which are labeled with reference character 18, are separated from the background using a suitable segmentation (for example a threshold value method). The measurement points from the respective right and left image of the stereo camera are then allocated to one another by subsequent triangulation. The disparity obtained from the allocation then determines the depth value of measurement points 18, thereby yielding the three-dimensional measurement points as discrete surface points $S_j$ of the measured object or wheel 3. These surface points can be represented, for example, as a three-dimensional surface network $O(p_{OM})$.

During acquisition of the structured-illumination images in chronological succession, the measured object is moved along (e.g. in the manner of a motor vehicle that enters a service facility hall and drives past). Measurement points 18 thus end up, at later points in time, at different locations on the measured object surface than at the previously imaged point in time. In the case of the images acquired under structured illumination, a kinematic model can determine the translation of the measured object (or vehicle) and of the wheel. This can be accomplished, for example, using suitable allocation methods in which the elevation values from images at different points in time are spatially correlated with one another.

As a rule, a kinematic model that also takes into account a rotation and a local deformation cannot be created exclusively on the basis of images under structured illumination. In the latter scenarios, information about grayscale values is additionally necessary.

By processing grayscale images acquired under unstructured illumination (FIGS. 3B and 3C) and allocating the grayscale information to the surface points $S_j$ that result from the images acquired under structured illumination (FIGS. 3A and 3C), it is possible to describe Euclidean motions $M_j(P_{OM})$ in a global coordinate system, $p_{OM}$ denoting corresponding surface model parameters. The time between the images acquired under structured and unstructured illumination is preferably short, so as to avoid shifts. The respective exposure time is also preferably selected to be sufficiently short that smearing of the image does not occur, but images of sufficient resolution and sharpness for subsequent image processing are instead present.

The terms "structured/unstructured exposure" and "images acquired under structured/unstructured illumination" are used here synonymously.

A combined depiction of an image exposed in structured and unstructured fashion corresponds to a triangulated surface with the texture mapped or imaged thereonto. A corresponding depiction is possible, for example, using the known OpenGL software for almost any operating system. The underlying OpenGL standard makes available several hundred instructions that permit the depiction of complex 3D scenes in real time and are executed directly by a graphics card of the computer being used. The corresponding calculations can thus be carried out quickly and efficiently.

Modern graphics cards that can be used, for example, in evaluation computer 15 of FIG. 2 are equipped with image and texture memories; images can be stored as a bitmap in the graphics card's memory. Suitable instructions are available, for example under the OpenGL quasi-standard, for transforming or mapping the acquired texture onto the ascertained surface points. Digital color images can thus be fused with 3D elevation information in order to generate a virtual representation of a real scene. These mechanisms are preferably utilized to create the three-dimensional model for the wheel region of the vehicle being examined. In the individual measurement operation that will be explained in further detail below, values relating to axle or wheel geometry, such as camber or track, can then be derived from the virtual (mathematical) representation.

Ascertained surface points that can be described in the acquired image sequence, by way of a rotation, with the kinematic model K that is used, are detected or defined as surface points of the wheel. The surface points on the body parts, such as a fender or wheel housing, can also correspondingly be described by the kinematic motion model. Because comparatively few grayscale features are generally available on the bodywork in the context of a non-contact measurement, i.e. using exclusively image acquisition, these surface points can additionally be employed for determination of the existing translation in the context of the calibration operation. In an optimization over the entire image sequence, as explained further with reference to the procedures in FIG. 4, the surface points on the wheel are fitted using a 3D surface model. A triangular mesh, a polynomial, or B-splines can be used, for example, as a 3D model. The more images that are made available by the calibration operation (steps S1 and S2 in FIG. 1), the better the surface points will be approached by the model upon optimization. The normal vector of the wheel in the context of calibration then supplies a measured value for determining the wheel rim runout, as explained e.g. in DE 10 2006 048 725. The calibration operation completes the determination of the wheel rim runout of a wheel, which is necessary for a precise determination of the track and camber values by way of a subsequent individual measurement.

Instead of the aforementioned stereo camera, a mono camera assemblage can also be used. The calibration operation for a single-camera system with correspondingly calibrated illumination is accomplished substantially as described above. The difference, however, lies in the calibration of the light source relative to the camera. The 3D measurement points $S_j$ of the surface at every point in time during image acquisition are calculated by triangulation, by way of the calibration parameters that are then known. The method required for this is known. As described above, the 3D surface model is in turn created, and provided with texture, from the images that are acquired without structural illumination.

Figure 4:
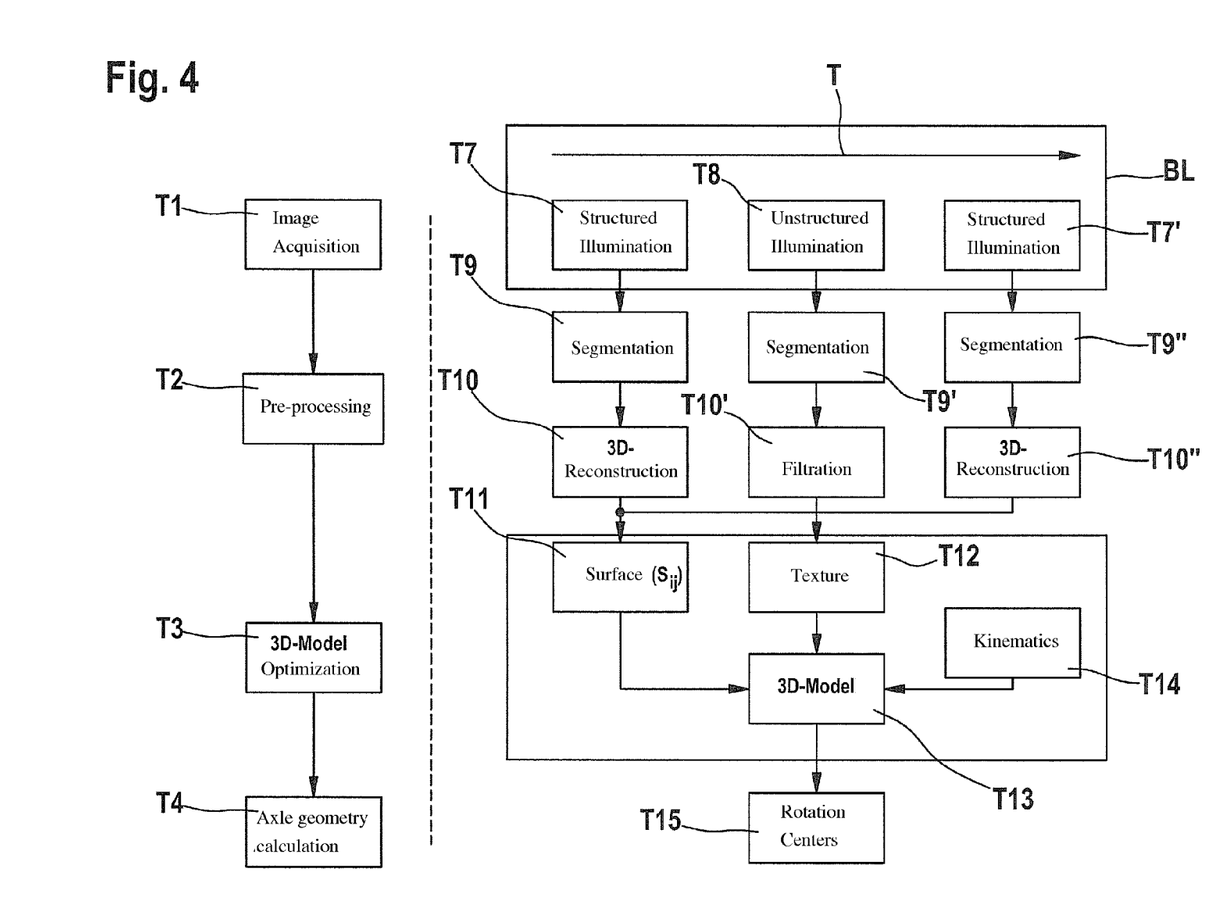
FIG. 4 shows a sequence of method steps for a calibration operation.

FIG. 4 depicts more-detailed method steps for a calibration operation. The principle is to acquire images (step T1), perform a pre-processing of the image data obtained (step T2), and then perform an optimization of the underlying three-dimensional model (step T3). This already yields, assuming the use of corresponding motion parameters or of the motion parameter values obtained by optimization, a preliminary axle geometry (step T4).

Possible implementations of motion, surface, and texture models will be explained in further detail below as examples. On the right side of FIG. 4, an alternating structured and unstructured illumination T7, T8, T9 is indicated in box BL. A time axis, indicated by way of example, proceeds here from left to right. While the vehicle is driving past, resulting in a traveling or rolling motion, an image sequence is acquired using chronologically and/or locally changing structured illumination, and an inherent texture of the object is acquired, for example using cameras 11 to 14 depicted in FIG. 2. Optionally, a segmentation T9, T9', T9", as described below, can be carried out. The images acquired with structured illumination T7, T7' provide a three-dimensional reconstruction of the imaged subject matter, i.e. the respective wheel and optionally additional parts of the bodywork. The diffuse or unstructured illumination T8 serves to ascertain a two-dimensional grayscale image that is utilized to determine the surface texture in the context of a surface model for the imaged subject matter. A filtering operation T10' can be performed in order to improve the grayscale image.

In order to construct a corresponding 3D surface model of the wheel and optionally of the bodywork, the wheel surface can be triangulated and texture information can furthermore be allocated. Mathematically, the following exemplifying elements of the three-dimensional model system can be determined.

Let $O(p_{OM})$ be the 3D description of the surface model by way of model parameters $p_{OM}$. For a triangulated surface, $p_{OM}$ is, for example, the respective vector of the point coordinates of a triangular mesh in the local model coordinate system of the wheel or bodywork, where $p_{OM}=(x_1, y_1, z_1, \ldots x_N, y_N, z_N)$, which can also be referred to as surface parameters of the surface model.

A parametric description of the texture on the surface model is performed, for example, using the vector $T(O(p_{OM}))$. This can be done, for example, via a point-by-point allocation of grayscale information from the image data derived using the unstructured illumination. Derived information, such as gradients or edge structures, on a triangle of the surface model can also be used as corresponding texture parameters.

The motion of the surface model at the respective image acquisition time j can be described via a geometric transformation $M_j(p_{OM})$. This can be accomplished, for example, as a Euclidean motion $M_j=[R_j, t_j]$ with a rotation $R_j$ and translation $t_j$ of the model coordinates $p_{OM}=(x_1, y_1, z_1, \ldots x_N, y_N, z_N)$ in a global coordinate system, e.g. in a reference to the road surface. The corresponding motion parameters at all times $j=1 \ldots M$ is summarized in the vector $M=(M_1, M_2, \ldots M_M)$.

A kinematic modeling K is performed using the kinematic parameters pK. This can be represented in general form as a function where $K(p_K, M)=0$. An assumed straight-line motion of the bodywork can be expressed, for example, as $R_j-R_{j+1}=0; \forall_j$. A motion of the wheel model with a defined relationship to the bodywork can also be assumed.

The 3D measurement of structural points or lines at time j is summarized in the vector $S_j$. These can be, for example, the 3D coordinates $(x_{ij}, y_{ij}, z_{ij})$ of structured point measurements, i.e. $S_j=x_{1j}, y_{1j}, z_{1j}, x_{2j}, y_{2j}, z_{2j}, \ldots$ ). Similar point-cloud representations are also disclosed and explained in DE 10 2006 048 725.

An optimization of the model parameters $p_{OM}$ of the 3D surface model, the texture parameters $T(O(p_{OM}))$, and the motion parameters $M_j(P_{OM})$ is then performed over the image sequence, so that the error between measurements and models becomes minimal. This is indicated in FIG. 4 as step T3 and steps T11 to T14. In order to define the values of the motion, kinematic, surface, and texture parameters, an optimization is performed in consideration of the surface model T11, texture model T12, and motion and kinematic model T14. In order to create as the result the complete three-dimensional model T13, an optimization problem must be solved:

$$\sum_{j=1}^{n} \left[ \alpha \int_G \|P(T(M_j(p_{OM})))-g_j\| dg - \beta \int_O \|S_j - O(M_j(p_{OM}))\| do \right] - \gamma \|K(p_K, M)\| \to \min. \quad (1)$$

The resulting minimization problem has the following components: The first term represents the difference between the 3D projection P of a textured 3D model in the image plane at imaging time j, and the measured (and optionally filtered) image signals gj:

$$\int_G |P(T(M_j(p_{OM})))-g_j| dg. \quad (2)$$

A good approximation to the two-dimensional grayscale image data gj is achievable here by incorporating the motion model $M_j(P_{OM})$ for the texture and the projection. The first term can be construed as a degree of deviation between acquired grayscale image data and a projection of texture parameters subjected to the motion model and mapped onto the three-dimensional surface model. The distance or deviation is calculated over the image region G that covers the projection P. A corresponding procedure is described in further detail, for example, in B. Rosenhahn, H. Ho, and B. Klette: "Block matching based on 2D-3D pose estimation," Proc. Image and Vision Computing 2004, pp. 309-314, 2004, Landcare Research Ltd., Akaroa, New Zealand.

The second term in equation (1) corresponds to the distance or deviation between the 3D surface model $O(M_j(p_{OM}))$ and the measurements $S_j$ of the structure projection at the respective time j, and can be expressed as:

$$\int_O |S_j - O(M_j(p_{OM}))| do. \quad (3)$$

Integration is performed here over the region O that is visibly used in the respective image, and all measurements $S_j$ of the structure projection are taken into account. The second term can be construed as a degree of deviation between three-dimensional point clouds determined from the acquired images and three-dimensional surface parameters subjected to the motion model.

Lastly, the third term encompasses the corresponding kinematic motion modeling:

$$\gamma K(p_K, M), \quad (4)$$

which can be construed as a norm of the motion model that depends on a geometric transformation by the motion parameters and kinematic parameters.

The weighting coefficients $\alpha$, $\beta$, and $\gamma$ are factors for weighting the individual components in the optimization process, and are selected, for example, from the results of simulations or test measurements.

The actual optimization of the parameters is preferably accomplished using known variation computation methods. One example of this is described in Papenberg et al., "Highly accurate optic flow computation with theoretically justified warping" in Int. Journal of Computer Vision, Vol. 67, No. 2, pp. 141-158, April 2006. Further known variation methods are explained in "Numerical Recipes in C/C++: The Art of Scientific Computing," Cambridge University Press, 2002. The method described in DE 10 2006 048 725 can be used, for example, to perform an initialization of the respective model parameters.

A knowledge of the values of the motion parameters M allows calculation of the rotation axis or rotation center (steps T4 and T15) with reference to the global coordinate system. This makes possible, for example, calculation of the chassis geometry, e.g. track and camber. DE 10 2006 035 924 indicates, for example, corresponding calculation methods.

What is obtained as a result of the calibration operation, which is used ultimately for subsequent measurements with the vehicle stationary, are the values of the parameters of the model $p_{OM}$, the values for surface texture parameters of the model, and further selected parameters of the kinematic model pk being used, for example the location of rotation centers and rotation axes with respect to the model description.

In a variant of the calibration operation, instead of creating a respective three-dimensional model for each wheel region it is also possible to create a common 3D model for the wheels of an axle. Because the same rims and tires are, as a rule, installed on one axle, the corresponding 3D model can be created on the basis of measured data from both wheels. With this procedure, more support points are available in the context of optimization for creation of the 3D model.

Figure 5:
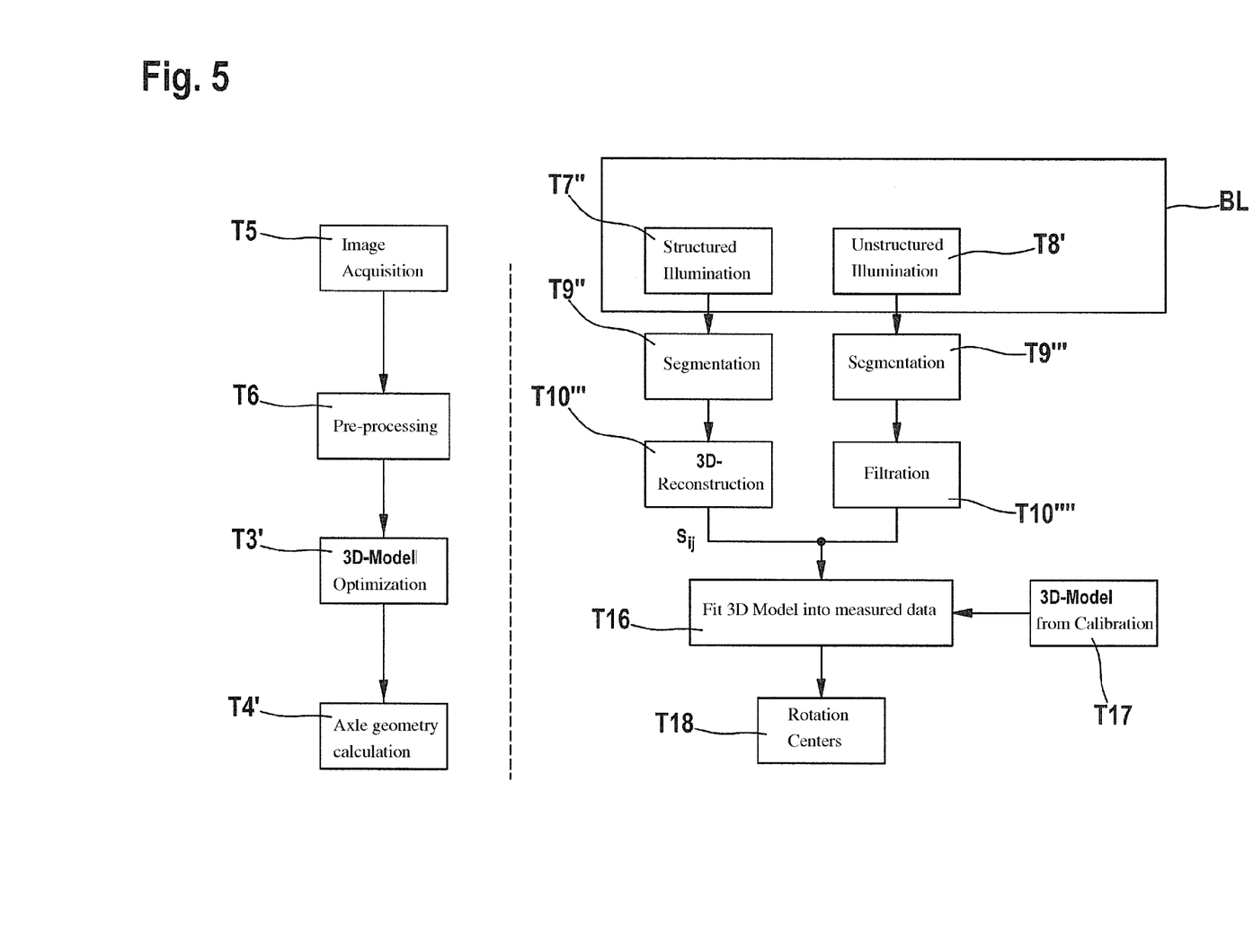
FIG. 5 shows a sequence of method steps for a measurement operation.

FIG. 5 depicts possible method steps for an individual measurement operation on the stationary vehicle, once the three-dimensional model to be used subsequently as a basis has been determined in the calibration operation. The principle is to acquire images (step T5), perform a pre-processing of the image data obtained (step T6), and then carry out a further optimization, on the basis of the acquired images from step T5, of the underlying three-dimensional model (step T3'). This yields, assuming the use of corresponding motion parameters or of the motion parameter values obtained as a result of the optimization in step T3', the axle geometry of the vehicle (step T4').

The model terms of equation (1), explained with reference to FIG. 4, will now be discussed again with regard to the motion, surface, and texture models. On the right side of FIG. 5, a structured and unstructured illumination T7", T8" is indicated in box BL. The two images can be acquired in any sequence. With the vehicle stationary, what is made is therefore one image that is taken with structured illumination and senses the three-dimensional surface of the wheel region, and one image of an inherent texture of the object under unstructured illumination. Individual images j are acquired, for example, respectively with and without a structure projection. For example, cameras 11 to 14 depicted in FIG. 2 are used. Optionally, a segmentation T9", T9''' can be performed. The image acquired with structured illumination T7" makes possible, as described above, a three-dimensional reconstruction of the imaged subject matter, i.e. of the respective wheel and optionally of further parts of the bodywork. The diffuse or unstructured illumination T8' serves to ascertain a two-dimensional grayscale image that is employed to determine the surface texture in the context of a surface model for the imaged subject matter. A filtration T10"" can be performed in order to improve the grayscale image.

The 3D model generated in the calibration operation (see FIG. 4), having the optimized values for the surface parameters $p_{OM}$ and texture parameters $T(p_{OM})$, is used for individual measurements, for example to align the chassis.

In an optimization method performed again according to equation (1), in step T3' and steps T16 and T17 only the motion parameters $M_j$ of the bodywork and wheel are modified, so that the 3D model available from the calibration operation fits optimally into the texture image $g_j$ currently being measured, and into the 3D data of the structure projection $S_j$. Known optimization methods and variation computations can be applied in this context.

Because the locations of the rotation axis and the rotation center with reference to the surface model $p_{OM}$ are known from the calibration operation, a determination of the motion parameters $M_j$ also allows a transformation of the rotation axes and rotation centers into the global coordinate system of, for example, the lift or measurement stand. Desired data regarding axle geometry, rotation axes, and rotation centers are thus efficiently obtained in step T4' exclusively by non-contact scanning of the vehicle (steps T4' and T18).

A variant for fitting a known 3D surface model into a grayscale image is presented, for example, in B. Rosenhahn, H. Ho, and B. Klette: "Block matching based on 2D-3D pose estimation," Proc. Image and Vision Computing 2004, pp. 309-314, 2004, Landcare Research Ltd., Akaroa, New Zealand. In the method proposed, in addition to the texture features, the distance or deviation of the 3D measurements $S_j$ with respect to the surface model $O(p_{OM})$ is also minimized. For a triangulated surface, the distance of a measured point $S_{ji}$ from the closest triangle is ascertained, as was explained above with reference to FIG. 4.

In the individual measurement, the track values and/or camber values of the wheel, as well as the respective translation and normal vector, are determined from images acquired with structured illumination. The translation vector describes the correlation between the coordinate systems of the wheel and of the camera. The measured track/camber values are then corrected using the known wheel rim runout from the calibration operation. The different locations of the wheel axis and rotation axis in space are therefore also taken into account. In the calibration operation, a 3D model that optimally describes the measured data obtained on the wheel surface was constructed over the entire image sequence from surface and grayscale data. This 3D model is now utilized for the individual measurements. A fitting of the 3D model using the measured data can be performed, by way of a nonlinear optimization (e.g. using a Levenberg-Marquardt method) with an estimate of location and/or orientation (normal vector).

If the track and camber values measured by way of the steps described above lie outside a predetermined tolerance, the wheel suspension is, for example, correspondingly mechanically corrected until the values are in a target range. The procedure is identical for both a stereo and mono camera assemblage.

As a supplement to the factors (surface, texture, and motion) taken into account in creating the model, in a further variant of the method that has been presented, the body motion and localization of the wheel housing lower edge are also incorporated. Upon construction of the 3D surface description of the bodywork in the vicinity of the wheel cutout (e.g. the wheel well), a segmentation of the wheel travel is then simultaneously performed. "Segmentation" is understood in general as the generation of continuously connected regions in an image in accordance with a homogeneity criterion. In the present instance, a segmentation or allocation of pixels of the respective acquired image in a region that corresponds to the wheel well can further improve the alignment of the axle geometry.

The 3D surface description is in turn constructed during the calibration operation as the vehicle drives by, analogously to the explanation of FIG. 4. From the measurements of the structured and unstructured illumination, with incorporation of the kinematic model, a 3D surface description is generated which additionally contains information with regard to the texturing on the surface. In addition, the 3D surface at the transition edge from the wheel housing to the wheel is also segmented. Segmentation of the transition serves later on to localize the ride height of the vehicle.

Figure 6:
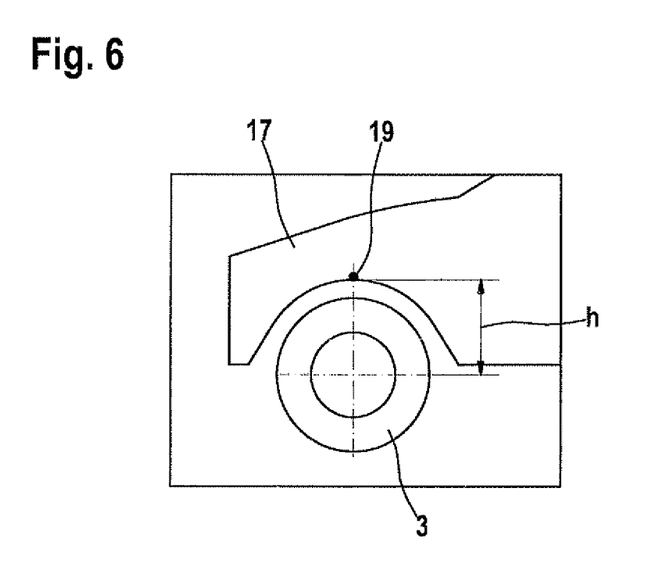
FIG. 6 is a schematic depiction to explain the ride height of an automobile body.

A determination of the ride height is depicted in FIG. 6, showing wheel 3 in the wheel well or bodywork 17. The wheel housing upper edge is labeled 19. The distance between wheel housing upper edge 19 and the center point of wheel 3 can be referred to as the ride height h of the vehicle. The ride height can be used, for example, to adjust the chassis; the spring compression state of the vehicle can be ascertained and a spring-compression-dependent correction of the target values for the track setting and/or camber setting can be performed as applicable.

The segmentation into wheel and wheel housing is accomplished by combining the two-dimensional image information of the grayscale values and the three-dimensional depth information from the structured illumination. The global optimization function is obtained in accordance with the general formulation of equation (1), adding a fourth term as a segmentation term:

$$\sum_{j=1}^{n} \left[ \alpha \int_Z |P(T(M_j(p_{OM}))) - g_j| dz - \beta \int_Z |S_j - M_j(p_{OM})| dz \right] + \quad (5)$$

$$\gamma K(p_K, M) + \eta \int_O |Z(M_j(p_{OM}), T(M_j(p_{OM})))| do \to \min$$

The segmentation term $$\eta \int_O |Z(M_j(p_{OM}), T(M_j(p_{OM})))| do \quad (6)$$

here describes the costs for segmenting the affinity function. It is possible to use, for example, a snake function as described in T. F. Chan and L. A. Vese, "Active Contours Without Edges," in IEEE Transactions on Image Processing, Vol. 10, No. 2, pp. 266-277, or a level set method according to J. A. Sethian, "Level Set Methods and Fast Marching Methods: Evolving Interfaces in Computational Geometry, Fluid Mechanics, Computer Vision and Material Science," Cambridge University Press, 1999. The respective resulting energy functional for the segmentation operation is represented symbolically by the term $Z_j(M_j(p_{OM}), T(M_j(P_{OM})))$.

Figure 7A:
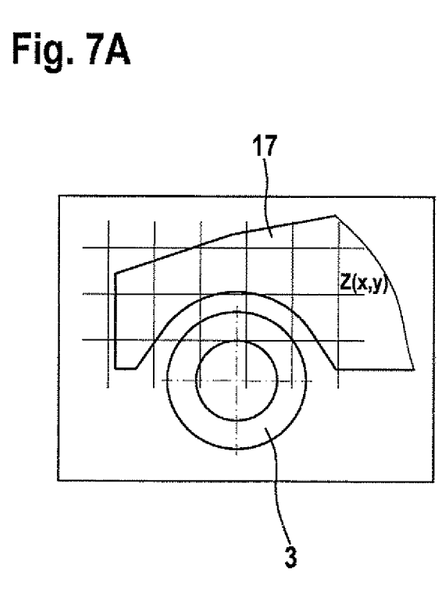
FIG. 7 is a schematic depiction to explain a segmentation.
Figure 7B:
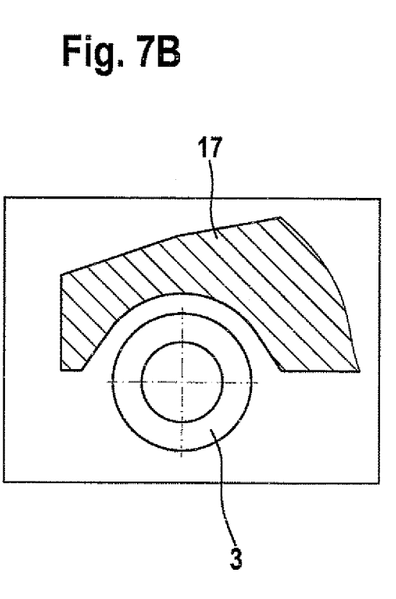
Figure 7C:
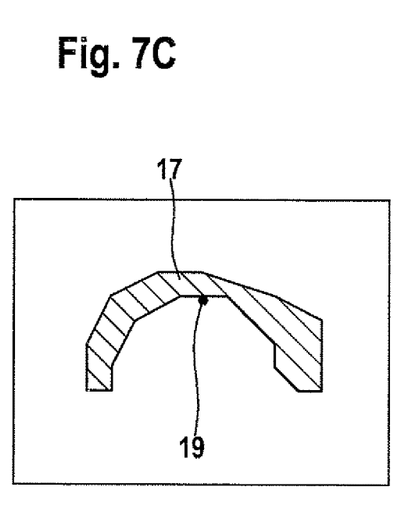

FIG. 7 schematically illustrates the constituents of the three-dimensional model, depicting wheel 3 and wheel well 17, each acquired as an image. Wheel housing upper edge 19 is also marked in FIG. 7C. FIG. 7A describes a depth image $O(p_{OM})$ that describes the surface of the bodywork and wheel with reference to a local coordinate system, for example using finite elements. FIG. 7B provides an image of the texture $T(x,y)$ with radiometric parameters (e.g. grayscale values), and FIG. 7C shows a segmentation image $L(x,y)$ that describes the affinity of the respective components of the depth image and radiometric image with the bodywork. The affinity function stipulates, for example, that all coordinates x,y where $L(x,y)>0$ belong to the bodywork. Preferably the body surface is modeled, up to the beginning of the wheel cutout (i.e. to the edge of the wheel well), by a surface having limited curvature. Integration over the region Z is thus an integration over all elements where $L(x,y)>0$.

An initialization of the surface model can be performed, for example, as a 3D plane perpendicular to the road surface and with a homogeneous distribution of the radiometric values (e.g. grayscale values). Wheel housing upper edge 19 can then be derived from the boundary of the segmentation.

With the methods explained above for acquiring measured data and evaluating them, axle geometries of vehicles can be determined easily and reliably. Acquisition of a sequence of images over time in the context of a traveling or rolling motion of the vehicle encompasses the sensing of respective wheel cutouts of the vehicle each with one image acquisition sensor, such as a suitable camera. In addition, a structured illumination is applied onto the scene. Firstly, a dynamic measurement is made as the vehicle travels past. From the ascertained data, a three-dimensional model description is generated of the wheel and/or of the bodywork that surrounds the wheel. The three-dimensional model description takes into account 3D measurements with the aid of the structure projection or structured illumination, 2D image measurements having features that are present on the measured object (wheel+bodywork) and are immovably connected to the measured object, and a kinematic or kinetic model between the wheel and bodywork and with respect to the vehicle motion. The values for the kinematic modeling parameters, e.g. the rotation axes and rotation centers of the wheel or wheels, are used to determine the axle geometry.

The ascertained model parameters can moreover be used for further measurement tasks, for example a shock absorber check, steering play testing, or body survey. A determination of the wheel housing lower edge can also be made from the 3D model description if, for example, a segmentation is performed by way of the acquired grayscale values and the 3D measurements. This makes possible a measurement of ride height, which may be desirable for some vehicle manufacturers in order to correct to predetermined target values.

In particular, no special targets or optical measurement marks on the wheel and bodywork are necessary. The sensing of the wheel motion and body motion is highly robust thanks to the construction of a 3D model incorporating multiple types of measurement. One is a structured illumination, for example in order to generate, with the aid of a stereo camera, three-dimensional point clouds for the wheel surface or bodywork surface. On the other hand, a wheel texture is sensed using a grayscale image of the wheel region. Kinematic or kinetic modeling can additionally be performed.

What is claimed is:

1. A method for determining at least one of (a) a wheel and (b) an axle geometry of a vehicle, comprising:
    illuminating a wheel region with structured and with unstructured light during a motion of at least one of (a) at least one wheel and (b) the vehicle;
    acquiring multiple images of the wheel region during the illumination, in order to create a three-dimensional surface model having surface parameters, a texture model having texture parameters, and a motion model having motion parameters of the sensed wheel region;
    calculating values for the surface parameters, the texture parameters, and the motion parameters using a variation computation as a function of the acquired images, in order to minimize a deviation of the three-dimensional surface model, texture model, and motion model from image data of the acquired images; and
    determining at least one of (a) a rotation axis and (b) a rotation center of the wheel as a function of the calculated values of the motion parameters, wherein the variation computation includes: minimizing a sum of a first, second, and third term, the first term encompassing a degree of deviation between acquired grayscale image data and a projection of texture parameters subjected to the motion model and mapped onto the three-dimensional surface model, the second term encompassing a degree of deviation between three-dimensional point clouds determined from the acquired images and three-dimensional surface parameters subjected to the motion model, and the third term encompassing a norm of the motion model that depends on a geometric transformation by the motion parameters and the kinematic parameters.

2. The method according to claim 1, further comprising:
- illuminating the wheel region with structured and with unstructured light while at least one of (a) the vehicle and (b) wheel is stationary;
- acquiring multiple images of the wheel region during illumination, in order to generate measurement image data of the wheel;
- modifying the values of the motion parameters, with fixed values for the surface and texture parameters, using a variation computation, such that a deviation of the three-dimensional surface model, texture model, and motion model from the measurement image data becomes minimal; and
- determining track and camber vectors, and normal and translation vectors, of the wheel as a function of the modified values of the motion parameters.

3. The method according to claim 1, wherein the images of the wheel region are acquired as at least one of (a) image data and (b) measurement image data by a stereo camera during the illumination with structured light, in order to determine three-dimensional point clouds by triangulation.

4. The method according to claim 1, wherein the images of the wheel region are acquired as at least one of (a) image data and (b) measurement image data during the illumination with unstructured light, in order to determine two-dimensional grayscale images.

5. The method according to claim 1, wherein the structured light encompasses at least one of (a) a regular light pattern, (b) a pattern of dots, and (c) ribbons of light.

6. The method according to claim 1, wherein a wheel rim runout of the wheel is ascertained from the rotation axis and the rotation center.

7. The method according to claim 1, wherein the first, second, and third term each having a weighting factor.

8. The method according to claim 1, wherein calculation of the values for the surface parameters, the texture parameters, and the motion parameters is accomplished in consideration of image data of multiple different wheels of a same axle of the vehicle.

9. The method according to claim 1, wherein a bodywork region adjacent to the wheel region is also sensed, and a segmentation is performed in terms of an affinity of an acquired image point with at least one of (a) the wheel and (b) the bodywork region.

10. The method according to claim 1, wherein a sum having a fourth term that encompasses a norm of a segmentation term that depends on texture parameters subjected to the motion model and mapped onto the three-dimensional surface model, and on the three-dimensional surface parameters subjected to the motion model.

11. The method according to claim 10, wherein a wheel housing upper edge is ascertained as a function of the segmentation in order to determine a ride height of the vehicle.

12. A measurement system, comprising:
- an illumination device adapted to illuminate at least one wheel region of a vehicle with structured and with unstructured light;
- at least one image acquisition device adapted to acquire at least one of (a) image data and (b) measurement image data of the wheel region; and
- a control and evaluation device adapted to perform the method recited in claim 1.

13. A non-transitory computer-readable storage medium with an executable program stored thereon, wherein the program instructs a microprocessor to perform a method as recited in claim 1.

* * * * *